US011921825B2

(12) United States Patent
Lavert et al.

(10) Patent No.: US 11,921,825 B2
(45) Date of Patent: *Mar. 5, 2024

(54) SYSTEM AND METHOD FOR DETERMINING TARGET FEATURE FOCUS IN IMAGE-BASED OVERLAY METROLOGY

(71) Applicant: KLA Corporation, Milpitas, CA (US)

(72) Inventors: Etay Lavert, Milpitas, CA (US); Amnon Manassen, Haifa (IL); Yossi Simon, Milpitas, CA (US); Dimitry Sanko, Vallejo, CA (US); Avner Safrani, Misgav (IL)

(73) Assignee: KLA Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,438

(22) Filed: Jan. 16, 2023

(65) Prior Publication Data

US 2024/0020353 A1 Jan. 18, 2024

Related U.S. Application Data

(63) Continuation of application No. 17/060,372, filed on Oct. 1, 2020, now Pat. No. 11,556,738.

(51) Int. Cl.
*G06N 20/00* (2019.01)
*G06F 3/0481* (2022.01)
(Continued)

(52) U.S. Cl.
CPC ............ *G06F 18/40* (2023.01); *G06F 3/0481* (2013.01); *G06F 18/214* (2023.01); *G06F 18/24* (2023.01);
(Continued)

(58) Field of Classification Search
None
See application file for complete search history.

(56) References Cited

U.S. PATENT DOCUMENTS 9,707,660 B2 7/2017 Vukkadala et al.
11,556,738 B2 * 1/2023 Lavert .................... G06V 20/00
(Continued)

FOREIGN PATENT DOCUMENTS

EP 1210634 B1 10/2010

OTHER PUBLICATIONS

PCT International Search Report and Written Opinion for International Application No. PCT/US2021/051163 dated Dec. 29, 2021, 7 pages.

*Primary Examiner* — Dov Popovici
(74) *Attorney, Agent, or Firm* — Suiter Swantz pc llo (57) ABSTRACT

A metrology system includes one or more through-focus imaging metrology sub-systems communicatively coupled to a controller having one or more processors configured to receive a plurality of training images captured at one or more focal positions. The one or more processors may generate a machine learning classifier based on the plurality of training images. The one or more processors may receive one or more target feature selections for one or more target overlay measurements corresponding to one or more target features. The one or more processors may determine one or more target focal positions based on the one or more target feature selections using the machine learning classifier. The one or more processors may receive one or more target images captured at the one or more target focal positions, the target images including the one or more target features of the target specimen, and determine overlay based thereon.

21 Claims, 4 Drawing Sheets (51) Int. Cl.
  *G06F 18/214*   (2023.01)
  *G06F 18/24*    (2023.01)
  *G06F 18/40*    (2023.01)
  *G06N 5/04*     (2023.01)
  *G06T 11/00*    (2006.01)

(52) U.S. Cl.
  CPC .............. *G06N 5/04* (2013.01); *G06N 20/00* (2019.01); *G06T 11/00* (2013.01); *G06T 2200/24* (2013.01)

(56) References Cited

U.S. PATENT DOCUMENTS

| | | | |
|---|---|---|---|
| 2016/0025650 A1* | 1/2016 | Lee ...................... | G01N 21/956 |
| | | | 348/87 |
| 2018/0191948 A1* | 7/2018 | Zheng .................. | G02B 21/244 |
| 2019/0228518 A1 | 7/2019 | Manassen et al. | |
| 2021/0027445 A1* | 1/2021 | Plihal .................... | G06F 18/214 |

* cited by examiner

SYSTEM AND METHOD FOR DETERMINING TARGET FEATURE FOCUS IN IMAGE-BASED OVERLAY METROLOGY

CROSS-REFERENCE TO RELATED APPLICATION

The present application claims priority to and constitutes a continuation patent application of U.S. patent application Ser. No. 17/060,372, filed on Oct. 1, 2020, which is incorporated herein by reference in its entirety.

TECHNICAL FIELD

The present disclosure relates generally to overlay metrology and, more particularly, to machine learning for target feature focus.

BACKGROUND

Image-based overlay metrology may typically include determining relative offsets between two or more layers on a sample based on relative imaged positions of features of an overlay target in the different layers of interest. The accuracy of the overlay measurement may thus be sensitive to image quality associated with imaged features on each sample layer, which may vary based on factors such as a depth of field or location of the plane (e.g., focal position) with respect to the sample. Accordingly, overlay metrology procedures typically include tradeoffs between image quality at particular sample layers and throughput. For example, it may be the case that overlay measurements based on separate images of each sample layer may provide the highest quality images of overlay target features. However, capturing multiple images per target may reduce throughput. By way of another example, overlay measurements based on a single image capturing features on multiple layers may provide relatively higher throughput, but may require reference measurements based on external tools or full-wafer measurements to provide a desired measurement accuracy. Therefore, it would be desirable to provide a system and method for curing defects such as those identified above.

SUMMARY

A metrology system is disclosed, in accordance with one or more embodiments of the present disclosure. In one embodiment, the metrology system includes a controller communicatively coupled to one or more through-focus imaging metrology sub-systems, wherein the controller includes one or more processors configured to execute a set of program instructions stored in memory, and wherein the set of program instructions is configured to cause the one or more processors to: receive a plurality of training images captured at one or more focal positions, the plurality of training images including one or more training features of a training specimen; generate a machine learning classifier based on the plurality of training images captured at one or more focal positions; receive one or more target feature selections for one or more target overlay measurements corresponding to one or more target features of a target specimen; determine one or more target focal positions based on the one or more target feature selections using the machine learning classifier; receive one or more target images captured at the one or more target focal positions, the one or more target images including the one or more target features of the target specimen; and determine one or more overlay measurements based on the one or more target images.

A metrology system is disclosed, in accordance with one or more embodiments of the present disclosure. In one embodiment, the metrology system includes one or more through-focus imaging metrology sub-systems. In another embodiment, the metrology system includes a controller communicatively coupled to the one or more metrology sub-systems, wherein the controller includes one or more processors configured to execute a set of program instructions stored in memory, and wherein the set of program instructions is configured to cause the one or more processors to: receive a plurality of training images captured at one or more focal positions, the plurality of training images including one or more training features of a training specimen; generate a machine learning classifier based on the plurality of training images captured at one or more focal positions; receive one or more target feature selections for one or more target overlay measurements corresponding to one or more target features of a target specimen; determine one or more target focal positions based on the one or more target feature selections using the machine learning classifier; receive one or more target images captured at the one or more target focal positions, the one or more target images including the one or more target features of the target specimen; and determine one or more overlay measurements based on the one or more target images.

A method for measuring overlay using one or more through-focus imaging metrology sub-systems is disclosed, in accordance with one or more embodiments of the present disclosure. In one embodiment, the method includes receiving a plurality of training images captured at one or more focal positions, the plurality of training images including one or more training features of a training specimen. In another embodiment, the method includes generating a machine learning classifier based on the plurality of training images captured at one or more focal positions. In another embodiment, the method includes receiving one or more target feature selections for one or more target overlay measurements corresponding to one or more target features of a target specimen. In another embodiment, the method includes determining one or more target focal positions based on the one or more target feature selections using the machine learning classifier. In another embodiment, the method includes receiving one or more target images captured at the one or more target focal positions, the one or more target images including the one or more target features of the target specimen. In another embodiment, the method includes determining one or more overlay measurements based on the one or more target images.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to systems and methods through-focus imaging of an overlay target on a sample to provide self-referenced overlay measurement recipes for additional overlay targets on the sample as well as process-monitoring between wafers.

Semiconductor devices are typically formed as multiple patterned layers of patterned material on a substrate. Each patterned layer may be fabricated through a series of process steps such as, but not limited to, one or more material deposition steps, one or more lithography steps, or one or more etching steps. Further, features within each patterned layer must typically be fabricated within selected tolerances to properly construct the final device. For example, overlay errors associated with relative misregistrations of features on different sample layers must be well characterized and controlled within each layer and relative to previously fabricated layers.

Accordingly, overlay targets may be fabricated on one or more sample layers to enable efficient characterization of the overlay of features between the layers. For example, an overlay target may include fabricated features on multiple layers arranged to facilitate accurate overlay measurements. In this regard, overlay measurements on one or more overlay targets distributed across a sample may be used to determine the overlay of corresponding device features associated with a semiconductor device being fabricated.

Image-based overlay metrology tools typically capture one or more images of an overlay target and determine an overlay between sample layers based on relative positions of imaged features of the overlay target on layers of interest. For example, features of overlay targets suitable for image-based overlay (e.g., box-in-box targets, advanced imaging metrology (AIM) targets, or the like) located on different sample layers may be, but are not required to be, arranged such that features on all layers of interest are simultaneously visible. In this regard, the overlay may be determined based on relative positions of features on layers of interest within one or more images of the overlay target. Further, overlay targets may be designed to facilitate overlay measurements between any number of sample layers in either a single measurement step or multiple measurement steps. For instance, features within any number of sample layers may be simultaneously visible for a single-measurement overlay determination between all sample layers. In another instance, an overlay target may have different sections (e.g., cells, or the like) to facilitate overlay measurements between selected layers. In this regard, overlay between all layers of interest may be determined based on measurements of multiple portions of the overlay target.

The accuracy of image-based overlay may depend on multiple factors associated with image quality such as, but not limited to, resolution or aberrations. For example, the system resolution may impact the accuracy at which positions of features may be determined (e.g., edge positions, centers of symmetry, or the like). By way of another example, aberrations in an imaging system may distort the sizes, shapes, and spacings of features such that position measurements based on an image may not accurately represent the physical sample. Further, image quality may vary as a function of focal position. For example, features outside of a focal volume of an imaging system may appear blurred and/or may have a lower contrast between overlay target features and background space than features within the focal volume, which may impact the accuracy of positional measurements (e.g., edge measurements, or the like).

Accordingly, it may be the case that capturing separate images of features on different layers of a sample (e.g., located at different depths in the sample) may provide accurate overlay metrology measurements. For example, a focal position (e.g., an object plane) of an image-based overlay metrology system may be adjusted to correspond to the depth of imaged features on each layer of interest. In this regard, features on each layer of interest may be imaged under conditions designed to mitigate focal position-dependent effects.

However, it is recognized herein that capturing multiple images of an overlay target at varying depths may negatively impact the throughput of the system, which may offset gains in accuracy associated with the multiple images. Embodiments of the present disclosure are directed to overlay measurements at multiple focal positions, where the multiple focal positions are determined in real-time by the metrology system and may correspond to the one or more varying depths at which one or more portions of one or more metrology targets is located. For example, an overlay measurement may be generated for an overlay target based on multiple images captured at multiple focal positions (e.g., including focal depths corresponding to locations of overlay target features), where the metrology system determines the multiple focal positions in real-time (e.g., such as through the use of a machine learning classifier).

Additional embodiments of the present disclosure are directed to translating one or more portions of the metrology system along one or more adjustment axes. For example, it may be the case that an optimal coordinate position at which a particular overlay measurement is taken may be different from the optimal coordinate position of a subsequent overlay measurement.

Additional embodiments of the present disclosure are directed to generating control signals based on the overlay measurements across the sample provided to process tools (e.g., lithography tools, metrology tools, or the like) as feedback and/or feedforward data.

Figure 1:
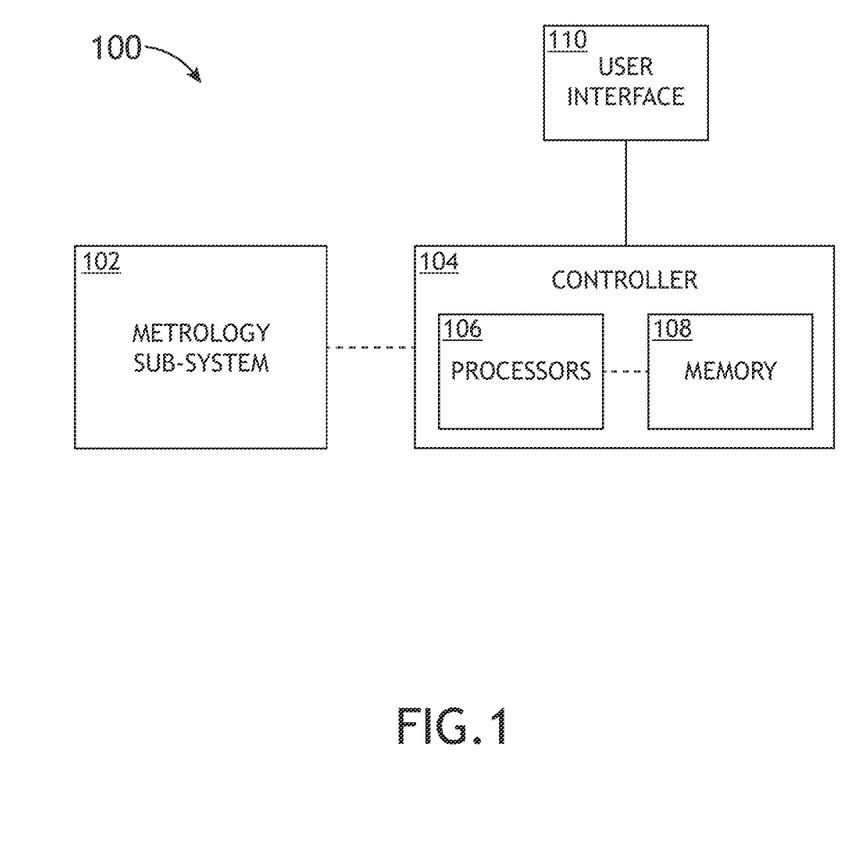
FIG. 1 is a conceptual view illustrating a metrology system, in accordance with one or more embodiments of the present disclosure.

FIG. 1 is a conceptual view illustrating an overlay metrology system 100, in accordance with one or more embodiments of the present disclosure. The system 100 may include, but is not limited to, one or more metrology sub-systems 102. The system 100 may additionally include, but is not limited to, a controller 104, wherein the controller includes one or more processors 106, a memory 108, and a user interface 110.

The one or more metrology sub-systems 102 may include any metrology sub-system known in the art including, but not limited to, an optical metrology sub-system. For example, the metrology sub-system 102 may include, but is not limited to, an optical-based metrology system a broadband metrology system (e.g., broadband plasma metrology system) or a narrowband inspection system (e.g., laser-based metrology system). In another instance, the metrology sub-system 102 may include a scatterometry-based metrology system. By way of another example, the one or more metrology sub-systems 102 may include any through-focus imaging metrology sub-system (e.g., an imaging metrology sub-system configured to construct one or more images of a specimen, where the one or more images are of a desired focus and are constructed using a plurality of images of the sample captured at different focal positions).

In one embodiment, the controller 104 is communicatively coupled to the one or more metrology sub-systems 102. In this regard, the one or more processors 106 of the controller 104 may be configured to generate and provide one or more control signals configured to make one or more adjustments to one or more portions of the one or more metrology sub-systems 102.

In another embodiment, the controller 104 is configured to receive a plurality of training images captured at one or more focal positions, wherein the plurality of training images includes one or more training features of a training specimen. For example, the controller 104 may be configured to receive the plurality of training images from the one or more metrology sub-systems 102.

In another embodiment, the controller 104 may be configured to generate a machine learning classifier based on the plurality of training images. For example, the controller 104 may be configured to use as inputs to the machine learning classifier the plurality of training images.

In another embodiment, the controller 104 may be configured to receive one or more target feature selections for one or more target overlay measurements, wherein the one or more target feature selections correspond to one or more target features of the target specimen. For example, the controller 104 may be configured to receive one or more target feature selections from a user via the user interface 110.

In another embodiment, the controller 104 may be configured to determine one or more target focal positions based on the one or more target feature selections. For example, the controller 104 may be configured to determine one or more target focal positions using the machine learning classifier.

In another embodiment, the controller 104 may be configured to receive one or more target images captured at the one or more target focal positions. For example, the controller 104 may be configured to receive one or more target images including the one or more target features at the one or more target focal positions.

In another embodiment, the controller 104 may be configured to determine one or more overlay measurements based on the one or more target images. For example, the controller 104 may be configured to determine overlay between a first layer of the target specimen and a second layer of the target specimen based on one or more target features formed on each of the first layer and the second layer.

Figure 2:
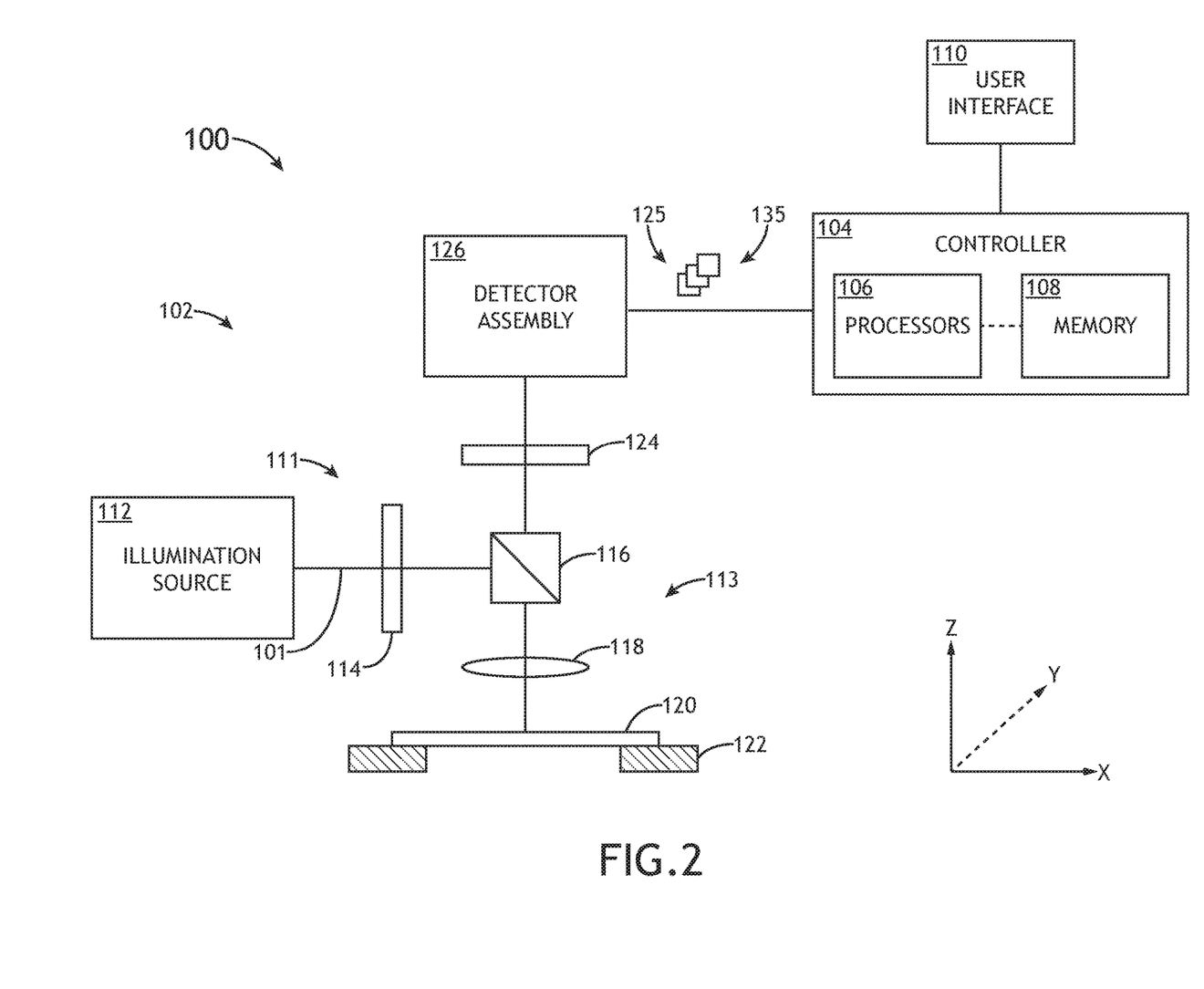
FIG. 2 is a simplified schematic view illustrating a metrology system, in accordance with one or more embodiments of the present disclosure.

FIG. 2 illustrates a simplified schematic view of the system 100, in accordance with one or more embodiments of the present disclosure. In particular, the system 100 as depicted in FIG. 2 includes an optical metrology sub-system 102 such that system 100 operates as an optical inspection system.

The optical inspection sub-system 102 may include any optical-based inspection known in the art. The metrology sub-system 102 may include, but is not limited to, an illumination source 112, an illumination arm 111, a collection arm 113, and a detector assembly 126.

In one embodiment, metrology sub-system 102 is configured to inspect and/or measure the specimen 120 disposed on the stage assembly 122. The illumination source 112 may include any illumination source known in the art for generating illumination 101 including, but not limited to, an illumination source configured to provide wavelengths of light including, but not limited to, vacuum ultraviolet radiation (VUV), deep ultraviolet radiation (DUV), ultraviolet (UV) radiation, visible radiation, or infrared (IR) radiation. In another embodiment, the metrology sub-system 102 may include an illumination arm 111 configured to direct illumination 101 to the specimen 120. It is noted that illumination source 112 of the metrology sub-system 102 may be configured in any orientation known in the art including, but not limited to, a dark-field orientation, a light-field orientation, and the like. For example, one or more optical elements 114, 124 may be selectably adjusted in order to configure the metrology sub-system 102 in a dark-field orientation, a bright-field orientation, and the like.

The specimen 120 may include any specimen known in the art including, but not limited to, a wafer, a reticle, a photomask, and the like. The specimen 120 may include any specimen having one or more overlay metrology targets known in the art to be suitable for image-based overlay metrology. For example, the specimen 120 may include an overlay metrology target that includes target features in one or more layers which may have been printed in one or more lithographically distinct exposures. The targets and/or the target features may possess various symmetries such as two-fold or four-fold rotation symmetry, reflection symmetry.

In one embodiment, the specimen 120 is disposed on a stage assembly 122, wherein the stage assembly 122 is configured to facilitate movement of specimen 120 (e.g., movement along one or more of an x-direction, a y-direction, or a z-direction). In another embodiment, the stage assembly 122 is an actuatable stage. For example, the stage assembly 122 may include, but is not limited to, one or more translational stages suitable for selectably translating the specimen 120 along one or more linear directions (e.g., x-direction, y-direction and/or z-direction). By way of another example, the stage assembly 122 may include, but is not limited to, one or more rotational stages suitable for selectively rotating the specimen 120 along a rotational direction. By way of another example, the stage assembly 122 may include, but is not limited to, a rotational stage and a translational stage suitable for selectably translating the specimen 120 along a linear direction and/or rotating the specimen 120 along a rotational direction. It is noted herein that the system 100 may operate in any metrology mode known in the art.

The illumination arm 111 may include any number and type of optical components known in the art. In one embodiment, the illumination arm 111 includes one or more optical elements 114, a set of one or more optical elements 115, a beam splitter 116, and an objective lens 118. In this regard, the illumination arm 111 may be configured to focus illumination 101 from the illumination source 112 onto the surface of the specimen 120. The one or more optical elements 114 may include any optical elements known in the art including, but not limited to, one or more mirrors, one or more lenses, one or more polarizers, one or more beam splitters, wave plates, and the like.

In another embodiment, the metrology sub-system 102 includes a collection arm 113 configured to collect illumination reflected or scattered from specimen 120. In another embodiment, the collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, wave plates, and the like. It is noted that detector assembly 126 may include any sensor and detector assembly known in the art for detecting illumination reflected or scattered from the specimen 120.

In another embodiment, the detector assembly 126 of metrology sub-system 102 is configured to collect inspection data of the specimen 120 based on illumination reflected or scattered from the specimen 120. In another embodiment, the detector assembly 126 is configured to transmit collected/acquired images and/or metrology data to the controller 104.

The metrology system 100 may be configured to image the specimen 120 at any selected measurement plane (e.g., at any position along a z-direction). For example, a location of an object plane associated with an image generated on the detector assembly 126 with respect to the specimen 120 may be adjusted using any combination of components of the metrology system 100. For example, the location of the object plane associated with an image generated on the detector assembly 126 with respect to the specimen 120 may be adjusted by controlling a position of the stage assembly 122 with respect to the objective lens 118. By way of another example, the location of the object plane associated with an image generated on the detector assembly 126 with respect to the specimen 120 may be adjusted by controlling a position of the objective lens 118 with respect to the specimen 120. For instance, the objective lens 118 may be mounted on a translation stage configured to adjust a position of the objective lens 118 along one or more adjustment axes (e.g., an x-direction, a y-direction, or a z-direction). By way of another example, the location of the object plane associated with an image generated on the detector assembly 126 with respect to the specimen 120 may be adjusted by controlling a position of the detector assembly 126. For instance, the detector assembly 126 may be mounted on a translation stage configured to adjust a position of the detector assembly 126 along the one or more adjustment axes. By way of another example, the location of the object plane associated with an image generated on the detector assembly 126 with respect to the specimen 120 may be adjusted by controlling a position of the one or more optical elements 124. For instance, one or more optical elements 124 may be mounted on translation stages configured to adjust positions of the of the one or more optical elements 124 along the one or more adjustment axes. It is specifically noted herein that the controller 104 may be configured to perform any of the foregoing adjustments by providing one or more control signals to one or more portions of the metrology sub-system 102.

As noted previously herein, the controller 104 of system 100 may include one or more processors 106 and memory 108. The memory 108 may include program instructions configured to cause the one or more processors 106 to carry out various process steps described throughout the present disclosure. For example, the program instructions are configured to cause the one or more processors 106 to adjust one or more characteristics of the metrology sub-system 102 in order to perform one or more of the process steps of the present disclosure. Further, the controller 104 may be configured to receive data including, but not limited to, imagery data associated with the specimen 120 from the detector assembly 126.

The one or more processors 106 of the controller 104 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 106 may include any device configured to execute algorithms and/or instructions (e.g., program instructions stored in memory). In one embodiment, the one or more processors 106 may be embodied as a desktop computer, mainframe computer system, workstation, image computer, parallel processor, networked computer, or any other computer system configured to execute a program configured to operate or operate in conjunction with the metrology system 100, as described throughout the present disclosure Moreover, different components of the system 100 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller 104 or, alternatively, multiple controllers. Additionally, the controller 104 may include one or more controllers housed in a common housing or within multiple housings. In this way, any controller or combination of controllers may be separately packaged as a module suitable for integration into metrology system 100. Further, the controller 104 may analyze data received from the detector assembly 126 and feed the data to additional components within the metrology system 100 or external to the metrology system 100.

The memory 108 may include any storage medium known in the art suitable for storing program instructions executable by the associated one or more processors 106. For example, the memory 108 may include a non-transitory memory medium. By way of another example, the memory 108 may include, but is not limited to, a read-only memory (ROM), a random-access memory (RAM), a magnetic or optical memory device (e.g., disk), a magnetic tape, a solid-state drive and the like. It is further noted that memory 108 may be housed in a common controller housing with the one or more processors 106. In one embodiment, the memory 108 may be located remotely with respect to the physical location of the one or more processors 106 and controller 104. For instance, the one or more processors 106 of controller 104 may access a remote memory (e.g., server), accessible through a network (e.g., internet, intranet and the like).

In one embodiment, the user interface 110 is communicatively coupled to the controller 104. The user interface 110 may include, but is not limited to, one or more desktops, laptops, tablets, and the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110

In another embodiment, the controller 104 is communicatively coupled to one or more elements of the metrology system 100. In this regard, the controller 104 may transmit and/or receive data from any component of the metrology system 100. Further, the controller 104 may direct or otherwise control any component of the metrology system 100 by generating one or more control signals for the associated components. For example, the controller 104 may be communicatively coupled to the detector assembly 126 to receive one or more images from the detector assembly 126.

Figure 3:
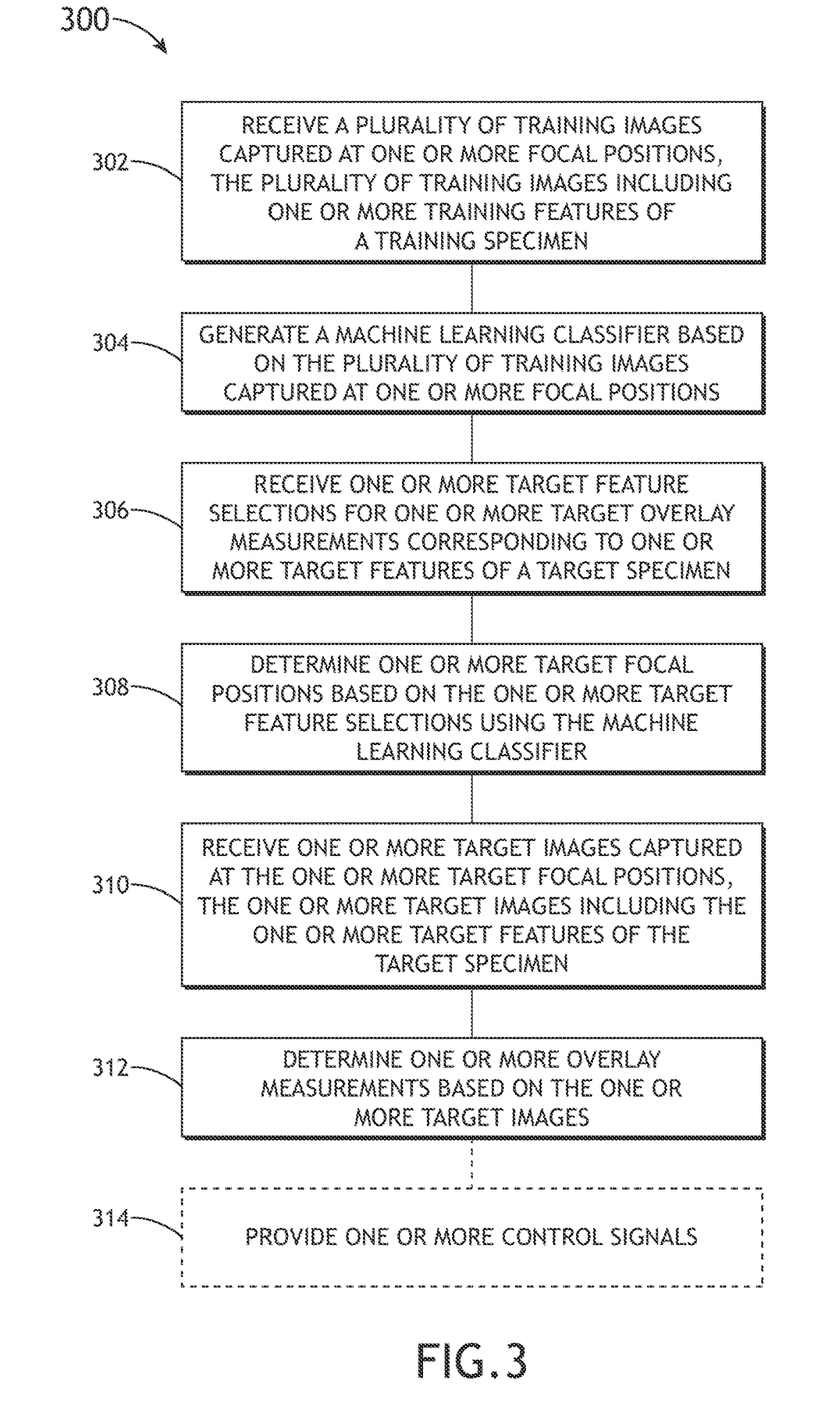
FIG. 3 is a flow diagram illustrating steps performed in a method for measuring overlay, in accordance with one or more embodiments of the present disclosure.

FIG. 3 illustrates a method 300 of measuring overlay, in accordance with one or more embodiments of the present disclosure.

In step 302, a plurality of training images captured at one or more focal positions is received. For example, a plurality of training images 125 may be received by the controller 104 from the metrology sub-system 102. In this regard, the plurality of training images 125 may include optical training images. In additional and/or alternative embodiments, the controller 104 may be configured to receive one or more training images 125 from a source other than the one or more metrology sub-systems 102. For example, the controller 104 may be configured to receive one or more training images 125 of features of a specimen 120 from an external storage device and/or memory 108. In another embodiment, controller 104 may be further configured to store received training images 125 in memory 108.

The plurality of training images 125 may include one or more training features of a training specimen. For example, the plurality of training images 125 may include images captured at multiple depths of the training specimen. In this regard, the one or more training features of the training specimen may include one or more training target features formed at different layers of the training specimen. The metrology sub-system 102 may be configured to capture the plurality of training images 125 at one or more focal positions corresponding to the depth (e.g., position along the z-direction) of a particular training feature. In one embodiment, the metrology sub-system 102 may be configured to capture the plurality of training images 125 within a focus training range, wherein the focus training range comprises a plurality of focal positions corresponding to a plurality of depths of the one or more training features. The focus training range may be provided by a user via the user interface 110.

In step 304, a machine learning classifier is generated based on the plurality of training images. For example, the controller 104 may be configured to generate a machine learning classifier based on the plurality of training images. The controller 104 may be configured to generate the machine learning classifier via any one or more techniques known in the art, including, without limitation, supervised learning, unsupervised learning, and the like.

For example, in the context of supervised learning, the plurality of training images 125 may include varying degrees of focus based on the focal position at which each of the plurality of training images was captured (e.g., the plurality of training images may include a plurality of through-focus images of one or more features of the sample)+. In this regard, the controller 104 may receive one or more optimal focus tolerances such that the controller 104 may determine one or more training images of the plurality of training images that fall within the one or more optimal focus tolerances. Accordingly, the plurality of training images 125 and the one or more optimal focus tolerances may be used as inputs to train the machine learning classifier. The controller 104 may be further configured to store the plurality of training images 125, the optimal focus tolerances, and the generated machine learning classifier in memory 108.

The one or more optimal focus tolerances may be configured such that the machine learning classifier may be configured to determine one or more target focal positions for one or more target overlay measurements. In this regard, the one or more optimal focus tolerances may be configured to ensure that one or more target images that may be subsequently captured at the one or more target focal positions are of sufficient quality for overlay measurement by the controller 104. The one or more optimal focus tolerances may be provided by a user via the user interface 110. In another embodiment, the controller 104 may be configured to determine the one or more optimal focus tolerances using any technique known in the art. For example, the controller 104 may be configured to determine the one or more optimal focus tolerances based on a contrast precision function (e.g., a function configured to determine a focus at which noise is minimal based on a plurality of images captured at multiple focal positions). In an alternative embodiment, the controller 104 may be configured to determine the one or more optimal focus tolerances using a Linnik interferometer integrated into or generated by one or more portions of the metrology sub-system 102. By way of another example, one or more portions of the metrology sub-system 102 (e.g., the illumination source 112 and/or one or more portions of the illumination arm 111) may be configured to illuminate the sample, where the controller 104 may be configured to generate a Linnik interferogram (e.g., a low coherence interferogram) based on illumination collected by the detector assembly 126. In this regard, the controller 104 may be configured to determine a peak (e.g., a point having the greatest contrast of all collected images) of the interferogram and may associate the peak with the through-focus position along a z-axis of the sample.

It is specifically noted that the embodiments of the present disclosure are not limited to the controller 104 generating or referencing a Linnik interferogram in order to determine the one or more optimal focus tolerances. For example, the controller 104 may be configured to generate a machine learning classifier configured to determine best focus and/or best position based on a plurality of training images generated based on illumination (e.g., illumination generated by a bright field and/or dark field microscopy device) emanating from various focal positions and/or position (e.g., a coordinate position on an x-axis and/or a y-axis, where the plurality of training images may be captured at various coordinate positions along one or both of such axes, such as via a translatable stage). In this regard, the machine learning classifier may be configured to determine the one or more optimal focus tolerances based on the plurality of training images, where the plurality of training images constitute focus slice images generated at various focal positions along a z-axis of the sample. By way of another example, the machine learning classifier may be configured to determine the one or more optimal focus tolerances based on the plurality of training images, where the plurality of training images include images captured at various focal positions along a z-axis of the sample, where the focus of the plurality of training images is varied using at least one of a coarse focusing mechanism, a lens triangulation mechanism, a bi-cell detector apparatus, and/or any range finding system known in the art to be suitable for the purposes contemplated by the present disclosure.

It is noted herein that the machine learning classifier generated in step 304 may include any type of machine learning algorithm/classifier and/or deep learning technique or classifier known in the art including, but not limited to, a random forest classifier, a support vector machine (SVM) classifier, an ensemble learning classifier, an artificial neural network (ANN), and the like. By way of another example, the machine learning classifier may include a deep convolutional neural network (CNN). For instance, in some embodiments, the machine learning classifier may include ALEXNET and/or GOOGLEN ET. In this regard, the machine learning classifier may include any algorithm, classifier, or predictive model, including, without limitation, any algorithm, classifier, or predictive model configured to generate a Linnik interferogram and to determine the one or more target focal positions for one or more target overlay measurements using the Linnik interferogram. In some embodiments, the machine learning classifier may comprise a neural network having multiple layers and receptors. For example, the machine learning classifier may comprise a neural network having approximately five layers and approximately fifty receptors.

In Step 306, one or more target feature selections for one or more target overlay measurements corresponding to one or more target features of a target specimen are received. For example, the controller 104 may be configured to receive the one or more target feature selections for one or more target overlay measurements from a user via the user interface 110. The one or more target feature selections may include one or more signals configured to direct the system 100 to capture one or more target images including the one or more target features of the target specimen. Upon receipt of the one or more target feature selections, the controller 104 may be configured to determine one or more expected depths of the one or more target features within the target specimen. For example, the controller 104 may be provided the one or more expected depths of the one or more target features for overlay measurement by a user via the user interface 110. In another embodiment, the controller 104 may determine the one or more expected depths of the one or more target features for overlay measurement by reference to one or more design files or other data corresponding to the target specimen stored in memory 108. In another embodiment, the controller 104 may determine the one or more expected depths of the one or more target features for overlay measurement based on the Linnik interferogram. For example, the controller 104 may determine the one or more expected depths by reference to the peak of the Linnik interferogram associated with the through-focus position along the z-axis of the sample.

In Step 308, one or more target focal positions based on the one or more target feature selections are determined using the machine learning classifier. For example, the controller 104 may be configured to determine the one or more target focal positions based on the one or more target feature selections using the machine learning classifier. By way of another example, the controller 104 may provide the one or more expected depths of the one or more target features of the target specimen as an input to the machine learning classifier. In this regard, the machine learning classifier may be configured to provide the one or more target focal positions based on the plurality of training images 125 and the optimal focus tolerances. It is noted that the machine learning classifier may be configured to determine one or more target focal positions for one or more target overlay measurements by determining one or more focal positions within 1 micron of a focal position provided by the contrast precision function and/or the Linnink interferogram function.

In some embodiments, upon determination of the one or more target focal positions based on the one or more target feature selections, the controller 104 may be configured to determine and/or provide one or more control signals to one or more portions of the one or more metrology sub-systems 102, wherein the one or more control signals are configured to cause the one or more portions of the one or more metrology sub-systems 102 to be translated along one or more adjustment axes (e.g., an x-direction, a y-direction, and/or a z-direction). For example, the controller 104 may be configured to provide one or more control signals to the stage assembly 122 and/or the detector assembly 126 such that the target specimen is located at one of the one or more determined target focal positions. In another embodiment, the controller 104 may be configured to provide one or more control signals to at least one of the optical elements 114, 115, the beam-splitter 116, the objective lens 118, or the optical elements 124, in order to enable the metrology sub-system 102 to capture one or more target images at the one or more target focal positions.

In the case of a machine learning classifier configured to determine the one or more optimal focus tolerances based on the plurality of training images using a coarse focusing mechanism, the machine learning classifier may be configured to determine (and the controller 104 may be configured to provide) one or more control signals to the coarse focusing system, where the one or more control signals may be configured to cause the coarse focusing system adjust focus. It is specifically noted that the coarse focusing system may be configured to perform fine focus adjustments (e.g., ±2 micrometers of focal position adjustment).

In Step 310, one or more target images of the one or more target features captured at the one or more target focal positions are received. For example, the controller 104 may be configured to receive one or more target images 135 from the metrology sub-system 102. As it is used herein, the term "target images" may refer to images of the one or more target features captured at the one or more target focal positions and with which one or more overlay measurements will be determined. Thus, the term "target images" may be distinguished from "training images" which may be regarded as images of training features which may be used as inputs to train the machine learning classifier.

It is noted herein that any discussion regarding the acquisition of training images 125 may be regarded as applying to the acquisition of target images 135, unless noted otherwise herein. In additional and/or alternative embodiments, the controller 104 may be configured to receive one or more target images 135 from a source other than the one or more metrology sub-systems 102. For example, the controller 104 may be configured to receive one or more target images 135 of a specimen 120 from an external storage device and/or memory 108.

In Step 312, one or more overlay measurements are determined based on the one or more target images. For example, the controller 104 may be configured to determine an overlay between a first layer of the target specimen and a second layer of the target specimen based on a first overlay measurement corresponding to one or more target features formed on the first layer of the target specimen and a second overlay measurement corresponding to one or more target features formed on the second layer of the target specimen. In this regard, the controller 104 may be configured to determine an offset (e.g., PPE) between the first layer and the second layer. The one or more overlay measurements may include any overlay measurement known in the art to be suitable for the purposes contemplated by the present disclosure, including those overlay measurements configured for use with specific target features of a specimen. In this regard, the controller 104 may be configured to utilize one or more overlay algorithms stored in memory 108 or otherwise provided to the controller 104 in order to determine the one or more overlay measurements.

In some embodiments, the method 300 may include a Step 312. In Step 312, one or more control signals are provided. For example, one or more control signals for adjusting one or more process tools (e.g., lithographic tools) are provided. As an additional example, the controller 104 may provide one or more control signals (or corrections to the control signals) to one or more portions of one or more process tools for adjusting the one or more parameters (e.g., fabrication settings, configuration, and the like) of the one or more process tools such that one or more parameters of the one or more process tools are adjusted. The controller 104 may determine the one or more control signals based on the one or more overlay measurements of the specimen. The control signals (or corrections to the control signals) may be provided by the controller 104 as part of a feedback and/or feedforward control loop. The controller 104 may cause the one or more process tools to execute one or more adjustments to the one or more parameters of the process tools based on the control signals, or the controller 104 may alert a user to make the one or more adjustments to the one or more parameters. In this sense, the one or more control signals may compensate for errors of one or more fabrication processes of the one or more process tools, and thus may enable the one or more process tools to maintain overlay within selected tolerances across multiple exposures on subsequent samples in the same or different lots.

Figure 4:
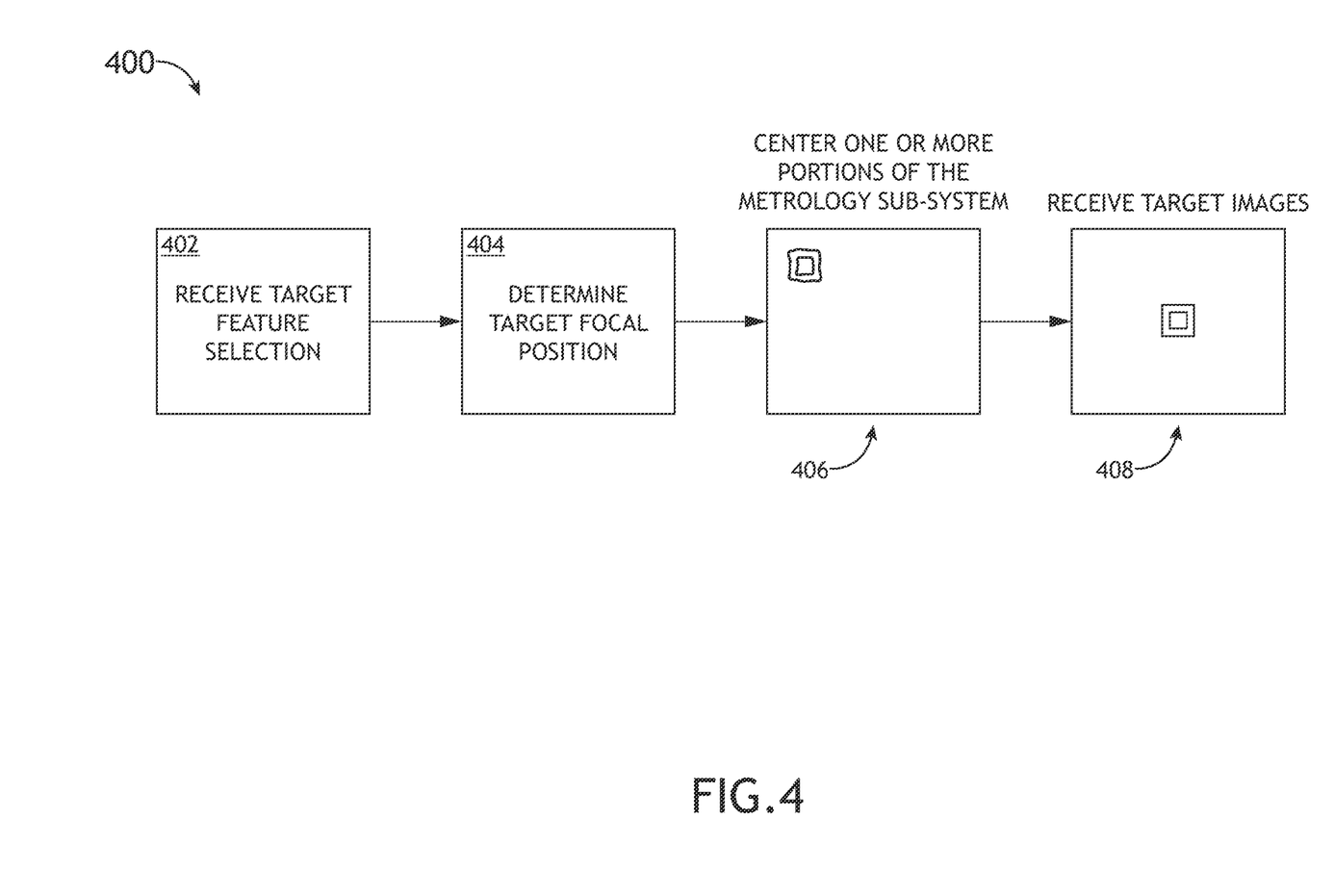
FIG. 4 is a flow diagram illustrating steps performed in a method for measuring overlay, in accordance with one or more embodiments of the present disclosure.

FIG. 4 illustrates a method 400 for measuring overlay, in accordance with one or more embodiments of the present disclosure.

In Step 402, one or more target feature selections for one or more target overlay measurements corresponding to one or more target features of a target specimen are received. For example, the controller 104 may be configured to receive the one or more target feature selections for one or more target overlay measurements from a user via the user interface 110. The one or more target feature selections may include one or more signals configured to direct the system 100 to capture one or more target images including the one or more target features of the target specimen. Upon receipt of the one or more target feature selections, the controller 104 may be configured to determine one or more expected positions (e.g., positions along an x-direction, a y-direction, and/or a z-direction) of the one or more target features within the target specimen. For example, the controller 104 may be provided the one or more expected positions of the one or more target features for overlay measurement by a user via the user interface 110. In another embodiment, the controller 104 may determine the one or more expected depths of the one or more target features for overlay measurement by reference to one or more design files or other data corresponding to the target specimen stored in memory 108.

In Step 404, one or more target focal positions based on the one or more target feature selections are determined. For example, the controller 104 may be configured to determine one or more target focal positions using the machine learning classifier based on the one or more target feature selections, where the one or more target feature selections correspond to one or more target features for one or more overlay measurements. By way of another example, the controller 104 may provide the one or more expected depths of the one or more target features of the target specimen as an input to the machine learning classifier. In this regard, the machine learning classifier may be configured to provide the one or more target focal positions based on the plurality of training images 125 and the optimal focus tolerances.

In some embodiments, as shown in Step 406, upon determination of the one or more target focal positions based on the one or more target feature selections, the controller 104 may be configured to determine and/or provide one or more control signals to one or more portions of the one or more metrology sub-systems 102, wherein the one or more control signals are configured to cause the one or more portions of the one or more metrology sub-systems 102 to be translated along one or more adjustment axes (e.g., an x-direction, a y-direction, and/or a z-direction). For example, in one embodiment, the controller 104 may be configured to provide one or more control signals to the stage assembly 122 and/or the detector assembly such that the one or more target features for overlay measurements are centered within a field of view of one or more components of the metrology sub-system 102. In this regard, the controller 104 may be configured to provide one or more control signals to one or more portions of the metrology sub-system 102 such that the target images 135 include the one or more target features at one or more centers of the target images 135. In another embodiment, the controller 104 may be configured to provide one or more control signals to the stage assembly 122 such that the target specimen is located at one of the one or more determined target focal positions. In another embodiment, the controller 104 may be configured to provide one or more control signals to at least one of the optical elements 114, 115, the beam-splitter 116, the objective lens 118, or the optical elements 124, in order to enable the metrology sub-system 102 to capture one or more target images at the one or more target focal positions.

It is specifically noted that the controller 104 may be configured to provide the one or more control signals to the one or more portions of the one or more metrology sub-systems 102 simultaneously. For example, the controller 104 may be configured to provide one or more control signals configured to cause simultaneous adjustments to the stage assembly 122 along an x-direction and/or a y-direction and to one or more other portions of the metrology sub-system 102 (e.g., the detector assembly 126 and/or the objective lens 118) along a z-direction.

It is additionally specifically noted that the controller 104 may be configured to use the machine learning classifier to determine the one or more control signals configured to cause the translation of one or more portions of the one or more metrology sub-systems 102. For example, the machine learning classifier may be configured to associate one or more positions (e.g., positions along an x-axis and/or a y-axis) with a desired the one or more target features. In this regard, the machine learning classifier may be configured to determine a position (e.g., a coordinate position on an x-axis and/or a y-axis) automatically center the one or more target features within a field of view.

In Step 408, one or more target images of the one or more target features captured at the one or more target focal positions are received. For example, the controller 104 may be configured to receive one or more target images 135 from the metrology sub-system 102.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system, comprising:
a controller communicatively coupled to one or more through-focus imaging metrology sub-systems, wherein the controller includes one or more processors configured to execute a set of program instructions stored in memory, and wherein the set of program instructions is configured to cause the one or more processors to:
receive a plurality of training images captured at one or more focal positions, one or more of the training images including one or more training features of a training specimen;
generate a machine learning classifier based on the plurality of training images captured at the one or more focal positions;
receive one or more target feature selections for one or more target overlay measurements corresponding to one or more target features of a target specimen;
determine one or more target focal positions based on the one or more target feature selections using the machine learning classifier;
receive one or more target images captured at the one or more target focal positions, the one or more target images including the one or more target features of the target specimen; and
determine one or more overlay measurements based on the one or more target images.

2. The system of claim 1, wherein the one or more through-focus imaging metrology sub-systems comprise at least one of: an optical-based metrology sub-system or a scatterometry-based metrology sub-system.

3. The system of claim 1, wherein the one or more focal positions comprise a plurality of focus positions within a focus training range.

4. The system of claim 1, wherein the plurality of training images is captured at the one or more focal positions by translating one or more portions of the metrology sub-systems along one or more adjustment axes.

5. The system of claim 4, wherein the set of program instructions is further configured to cause the one or more processors to:
provide one or more control signals to the one or more portions of the one or more metrology sub-systems, wherein the one or more control signals are configured to cause the one or more portions of the one or more metrology sub-systems to be translated along the one or more adjustment axes.

6. The system of claim 5, wherein the one or more control signals are configured to cause the one or more portions of the one or more through-focus imaging metrology sub-system to be centered.

7. The system of claim 1, wherein determining the one or more overlay measurements based on the one or more target images of the one or more target features comprises:
determining an overlay between a first layer of the target specimen and a second layer of the target specimen based on a first overlay measurement corresponding to the one or more target features formed on the first layer of the target specimen and a second overlay measurement corresponding to the one or more target features formed on the second layer of the target specimen.

8. The system of claim 1, wherein the one or more target feature selections for the one or more overlay measurements is provided by a user via a user interface.

9. The system of claim 1, wherein the set of program instructions is further configured to cause the one or more processors to:
provide one or more control signals to one or more process tools.

10. The system of claim 1, wherein the machine learning classifier comprises at least one of a deep learning classifier, a convolutional neural network, an ensemble learning classifier, a random forest classifier, or an artificial neural network.

11. A system, comprising:
one or more through-focus imaging metrology sub-systems; and
a controller communicatively coupled to the one or more through-focus imaging metrology sub-systems, wherein the controller includes one or more processors configured to execute a set of program instructions stored in memory, and wherein the set of program instructions is configured to cause the one or more processors to:
receive a plurality of training images captured at one or more focal positions, one or more of the training images including one or more training features of a training specimen;
generate a machine learning classifier based on the plurality of training images captured at the one or more focal positions;
receive one or more target feature selections for one or more target overlay measurements corresponding to one or more target features of a target specimen;
determine one or more target focal positions based on the one or more target feature selections using the machine learning classifier;
receive one or more target images captured at the one or more target focal positions, the one or more target images including the one or more target features of the target specimen; and
determine one or more overlay measurements based on the one or more target images.

12. A method of overlay measurement using one or more through-focus imaging metrology sub-systems, comprising:
receiving a plurality of training images captured at one or more focal positions, one or more of the training images including one or more training features of a training specimen;
generating a machine learning classifier based on the plurality of training images captured at the one or more focal positions;
receiving one or more target feature selections for one or more target overlay measurements corresponding to one or more target features of a target specimen;
determining one or more target focal positions based on the one or more target feature selections using the machine learning classifier;
receiving one or more target images captured at the one or more target focal positions, the one or more target images including the one or more target features of the target specimen; and
determining one or more overlay measurements based on the one or more target images.

13. The method of claim 12, wherein the plurality of training images and the one or more target images are captured by the one or more through-focus imaging metrology sub-systems comprising at least one of: an optical-based metrology sub-system or a scatterometry-based metrology sub-system.

14. The method of claim 12, wherein the one or more focal positions comprise a plurality of focus positions within a focus training range.

15. The method of claim 13, wherein the plurality of training images is captured at the one or more focal positions by translating one or more portions of the metrology sub-systems along one or more adjustment axes.

16. The method of claim 15, further comprising:
providing one or more control signals to the one or more portions of the one or more through-focus imaging metrology sub-systems, wherein the one or more control signals are configured to cause the one or more portions of the one or more through-focus imaging metrology sub-systems to be translated along the one or more adjustment axes.

17. The method of claim 16, wherein the one or more control signals are configured to cause the one or more portions of the one or more through-focus imaging metrology sub-systems to be centered.

18. The method of claim 12, wherein determining the one or more overlay measurements based on the one or more target images of the one or more target features comprises:
determining an overlay between a first layer of the target specimen and a second layer of the target specimen based on a first overlay measurement corresponding to the one or more target features formed on the first layer of the target specimen and a second overlay measurement corresponding to the one or more target features formed on the second layer of the target specimen.

19. The method of claim 12, wherein the one or more target feature selections for the one or more overlay measurements is provided by a user via a user interface.

20. The method of claim 12, further comprising:
providing one or more control signals to one or more process tools.

21. The method of claim 12, wherein the machine learning classifier comprises at least one of a deep learning classifier, a convolutional neural network, an ensemble learning classifier, a random forest classifier, or an artificial neural network.

* * * * *